M. N. VIRATELLE.
COMPENSATING SPRING FOR THE FRONT FORK OF MOTORCYCLES.
APPLICATION FILED AUG. 24, 1921.
1,397,845.
Patented Nov. 22, 1921.
2 SHEETS—SHEET 1.
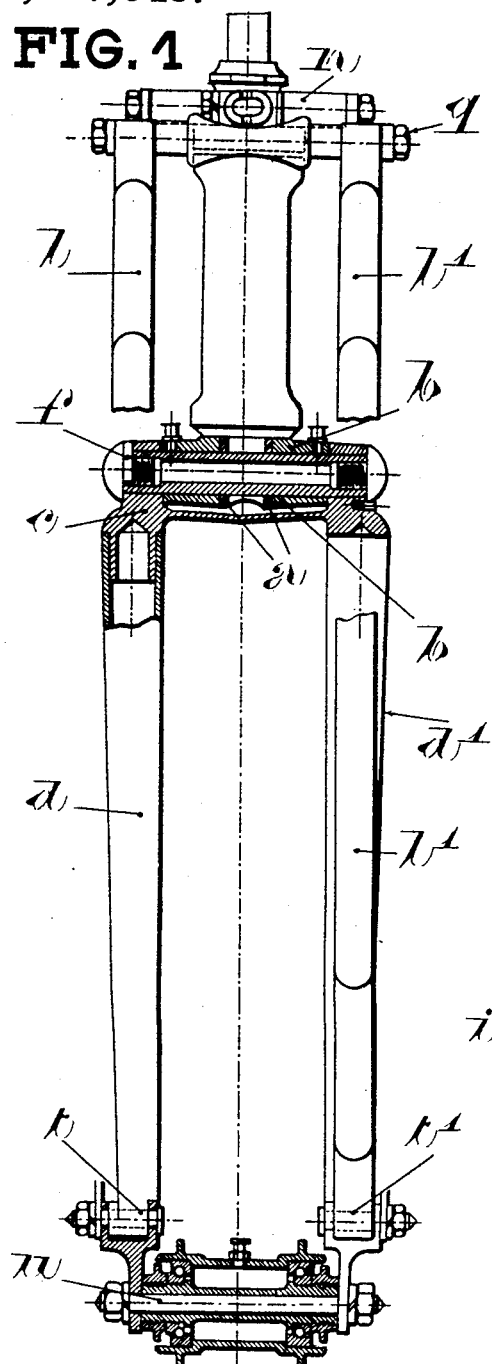
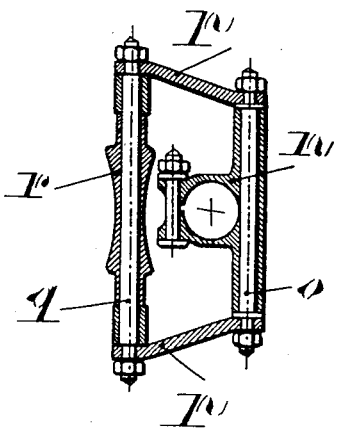
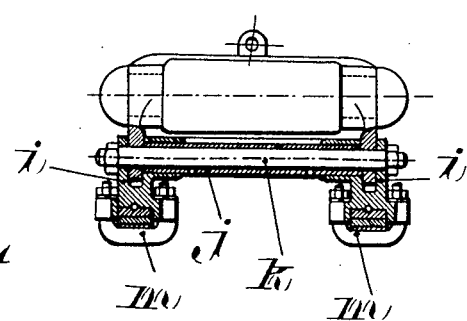

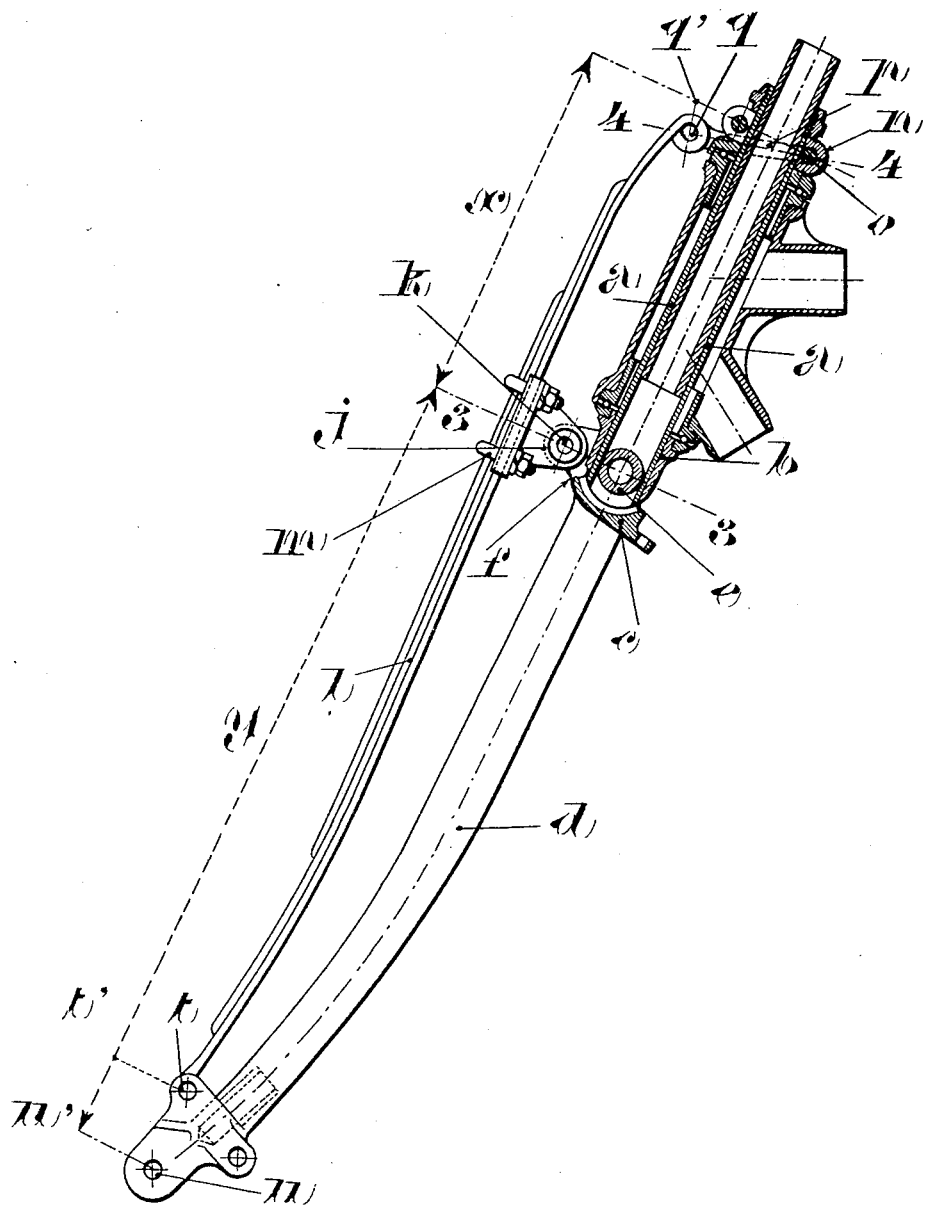

UNITED STATES PATENT OFFICE.

MARCEL NARCISSE VIRATELLE, OF VILLEURBANNE, RHÔNE, FRANCE.

COMPENSATING-SPRING FOR THE FRONT FORK OF MOTORCYCLES.

1,397,845.   Specification of Letters Patent.   Patented Nov. 22, 1921.

Application filed August 24, 1921. Serial No. 495,031.

(GRANTED UNDER THE PROVISIONS OF THE ACT OF MARCH 3, 1921, 41 STAT. L., 1313.)

*To all whom it may concern:*

Be it known that I, MARCEL NARCISSE VIRATELLE, a citizen of the French Republic, and resident of Villeurbanne, Rhône, France, have invented certain new and useful Improvements in Compensating-Springs for the Front Fork of Motorcycles, (for which I have filed an application in France, August 21, 1920, Patent No. 522,753,) of which the following is a specification.

In all motor cycles, the arrangement of springs, serving to damp the shocks and jolts to which the wheel is submitted by reason of unevenness of the road, is one of the principal points on which depends the good running and the life of the vehicle and also the comfort of the rider.

In the majority of actual arrangements such springing arrangement is formed by a spiral spring which is compressed when the front wheel is jolted; the functioning of such arrangements like the solidity of the whole arrangement, is always sacrificed to security. On the other hand especially on motor cycles with forks formed by two double uprights extending to the steering column, the play of the fork should be so great that its upper end extends occasionally beyond the steering column, pulling away and cutting the wires controlling the vehicle.

The object of the present invention is an arrangement of compensating springs capable of damping, by compression, all shocks of whatever power received by the front wheel to obtain a stiffening of the springs, consequently a resistance of metal proportional to the shock produced and to prevent all increased movement capable of damaging the controlling wires of the motor cycle. Moreover, the arrangement in question increases the resistance of the fork particularly in a lateral direction rendering the motor cycle especially applicable for sustaining additional loads even if these act laterally as in the case where a side car is coupled thereto.

With this object in view the fork pivots about the axis of the head of the fork which is arranged at the lower end of the steering column and carries on each of its members a compensating multiple laminated plate spring. Each spring is fixed at one end to the lower end of the fork member while its upper end is attached to a collar fixed around the steering column, the two springs being rigidly connected together by a system of articulation lever connected to the head of the fork. In this manner when the fork by reason of a chock, pivots frontward, the lower part of the spring is also projected toward the front and the force produced becomes applied against the articulation lever pivoting about the head of the fork. The force thus causes a straightening of the upper part which causes the intermediate articulation to rotate about its pivot. The laminations in the lower part being compressed, are stiffened, giving the spring a greater curvature in profile. The two actions obtained by the straightening of the upper part and the increase in curvature of the lower part of the spring act in opposite directions and tend to return the whole arrangement to its normal position of equilibrium.

The two multiple laminated plate springs connected at three different points to the fork and to the steering column, extend for the length of the fork forming a strong shield against all damage to the fork and render the latter applicable for work under difficult conditions even under lateral forced acting against it.

In the accompanying drawings is shown by way of example one form of the invention.

Figure 1 is a front view partly in section of the front fork of the motor cycle.

Fig. 2 is a vertical section showing the fork with its system of compensating springs.

Fig. 3 is a horizontal section on line 3—3 drawn to a larger scale, showing the head of the fork and the articulated levers connected to the springs.

Fig. 4 is a horizontal section on line 4—4 drawn to a larger scale of the articulated lever at the top of the spring connected by an affixing collar to the steering column.

The lower end of the steering column $a$ has the cross member $b$ of the head of the fork rigidly secured to it by brazing or the like, the cross member $c$ carries the shaft $e$ on which is articulated the head of the fork. The latter forms with the two members $d$ and $d'$ the fork of the front wheel of the motor cycle.

From the preceding description it is easy to see that the fork connected by its crown to the shaft e pivots in the cross member b at the bottom of the steering column.

At the two sides in relation to the fork members d and d' the crown is provided with a lug f about which the articulation levers i can pivot. The two levers i are held rigidly together by the sleeve j and the shaft k passing through the sleeve j and the lugs f and which serves as the articulation shaft. At the front the two levers i are connected by the straps m to the two compensating springs l l' of the multiple laminated plate type.

The upper ends of the springs which are bent to form a loop are fixed to a shaft q connected by the cheeks p to the affixing collar n surrounding the steering column by means of the shaft o about which the whole system of levers is articulated.

Between the two springs l and l', the shaft q carries a cross member r, the springs l and l' being held between the member r and the cheeks p. The lower end of the springs l and l' also terminate in loops and are connected to the articulation shafts t and t' carried by brackets connected to the hub u of the front wheel of the motor cycle, which brackets are rigidly affixed by brazing to the fork members d and d'.

By this arrangement the laminated springs are divided by the articulation lever i in two parts of unequal length; the lower part of length y corresponds to the fork members d and d' and the upper part, length x, corresponds to the steering column a. As the three points of attachment and of articulation of each of the springs are rigidly connected to those of the other spring, the two springs are themselves rendered solid with each other and all pressure applied to one of the springs is transmitted to the other.

The functioning of the system of compensating springs described above is as follows:—

Under the influence of a shock, the hub u of the front wheel, pivoted about the articulation shaft of the fork members d and d' is projected toward the front at u'. This causes the points of attachment of the springs l and l' to be moved to the point t'. The force of the shock is transmitted by the laminated springs l and l' to the articulation shaft q of the upper part x of the springs, which shaft, pivoted at o in the cheeks p and p', limits the movement to raise the shaft q to the point q'. This produces a straightening of the upper part x of the springs and consequently a bending of the articulation levers i about the shaft k. The articulation levers i receive from the upper part a downward pressure, and transmit this pressure to the lower part which is bowed and stiffened. By reason of the compression of the lower part y and the straightening of the upper part x, the two parts of the springs become set more firmly causing a resistance in the springs which becomes greater as the rotation of the fork d d' about its axis e is increased, i. e., when the shock received by the front wheel of the motor cycle is more violent. When the shock is over, the springs which are compressed at the lower part y return the whole arrangement to its position of equilibrium.

It is to be noted that the straightening of the upper part x of the springs and the compression of the lower part y are two forces which can be considered as subjecting the front wheel to the compensating action of two pairs of multiple laminated springs, the one acting in tension and the other in compression, but with the proportion of the work variable between them according to the power of the shock received.

Moreover the springs being divided into two parts by the articulation shaft i, the articulation shaft at the height q cannot be raised except under the most violent shocks, and then only for a very small distance, so that the controlling members situated above it cannot be hit by the said shaft.

Finally, the two compensating multiple laminated springs being rigidly affixed together and connected at the ends of the fork to a cradle and to a collar gripping the steering column, form a strong protection for the fork members and for the steering column, especially in the lateral direction, which prevents all movements of the fork. Thus a motor cycle provided with such compensating springs is especially applicable for overcoming the lateral forces such as are caused by the coupling of a side car to the motor cycle.

What I claim is:

An arrangement of compensating springs for the forks of motor cycles comprising two multiple laminated springs mounted in front of the front wheel of the motor cycle, one corresponding to each of the members of the fork, the lower ends of the springs being affixed to the lower ends of the corresponding members of the fork and the upper ends pivoting, by means of a pair of side cheeks, about a shaft rotating about a collar affixed to the steering column, the springs being connected also, between the two points of attachment, to the ends of intermediate articulation levers rigidly connected together, and connected to the head of the fork carrying the fork members and pivoting about the shaft at the end of the steering column, the attachment of the springs to these intermediate articulation levers dividing the springs into two parts of unequal length, a longer lower part and a shorter upper part, the whole being arranged in such a manner that if the front wheel of the motor cycle is lifted suddenly by any obstacle, the fork will be projected frontward, causing the short part of the springs to be straightened, and the longer lower part to be compressed on account of the play of the intermediate articulation so that the springs, under the double action of their deformation, will cause the whole arrangement to return to its normal position of equilibrium, substantially as described.

In witness whereof I affix my signature.

MARCEL NARCISSE VIRATELLE.

Witnesses:
 JEAN JETUNAM,
 L. ERCHER.